United States Patent [19]

Dixon

[11] Patent Number: 4,550,269

[45] Date of Patent: Oct. 29, 1985

[54] ELECTRIC DISCHARGE LAMPS

[75] Inventor: Angus B. Dixon, Lancashire, England

[73] Assignee: The General Electric Company, p.l.c., England

[21] Appl. No.: 546,813

[22] Filed: Oct. 31, 1983

[30] Foreign Application Priority Data

Feb. 4, 1983 [GB] United Kingdom ................. 8303074

[51] Int. Cl.⁴ ........................ C03C 29/00; A47B 88/00

[52] U.S. Cl. .................................. 313/331; 65/59.27; 65/59.32; 65/59.6; 65/59.7; 174/50.61

[58] Field of Search ...................... 313/331; 174/50.61; 65/59.27, 59.6, 59.7, 59.3, 59.31, 59.32

[56] References Cited

U.S. PATENT DOCUMENTS

| | | | |
|---|---|---|---|
| 3,448,321 | 6/1969 | Shanks | 313/331 X |
| 3,521,112 | 7/1970 | Walsh et al. | 65/29.27 X |
| 3,710,169 | 1/1973 | T'Jampens et al. | 313/331 X |

FOREIGN PATENT DOCUMENTS

| | | | |
|---|---|---|---|
| 479930 | 3/1929 | Fed. Rep. of Germany | 65/59.27 |
| 1389185 | 1/1965 | France | 313/331 |

*Primary Examiner*—Robert Lindsay
*Attorney, Agent, or Firm*—Kirschstein, Kirschstein, Ottinger & Israel

[57] ABSTRACT

In a high pressure electric discharge lamp employing at least one ribbon seal incorporating a strip (3) of refractory metal foil extending through the wall of an envelope (1) of fused silica, and connected at its outer end to at least one external lead rod (5) and at its inner end to a rod (4) which constitutes or provides a support for an electrode of the lamp, with the foil and adjacent ends of the lead rod or rods and the electrode embedded in the envelope wall, wherein a said lead rod and/or an electrode rod is surrounded, over at least a part of the region of the rod which is embedded in the envelope wall, by a closely wound coil (6) of a relatively thin refractory metal wire. This enables the fused silica of the envelope to be pressed tightly around the rod in that region in manufacture while reducing the tendency to crack on cooling.

15 Claims, 11 Drawing Figures

ELECTRIC DISCHARGE LAMPS

Figure 1:
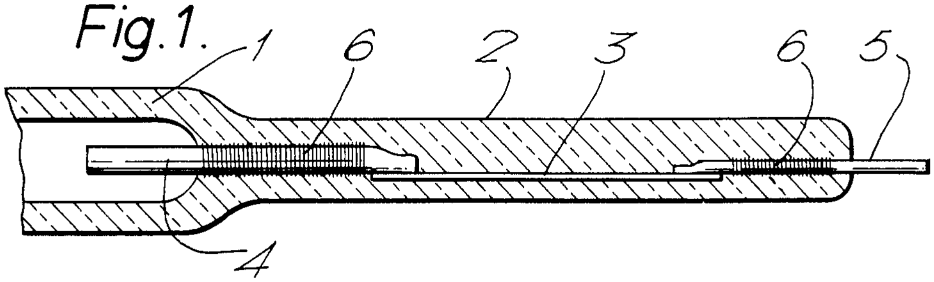

This invention relates to high pressure electric discharge lamps of the kind comprising a discharge envelope of fused silica containing a discharge supporting filling, i.e. of gas and/or vapour, and a pair of electrodes between which an electric discharge passes in operation of the lamp, and in which electric current is conveyed to the electrodes from the exterior of the envelope via so-called ribbon seals. Such a seal comprises, essentially, a strip of refractory metal foil, usually of molybdenum having one end connected electrically to a refractory metal rod which constitutes or provides a support for a respective electrode, and the opposite end connected electrically to at least one further refractory metal rod which projects from the envelope to provide an external lead, the foil and the adjacent ends of the electrode and lead rods being embedded in the envelope wall.

At the ends of such a seal it is important that the fused silica is pressed firmly around the electrode and lead rods, especially in the regions where they join the strip of foil. Thus if a rod is not held sufficiently tightly by the silica any relative movement which is allowed to take place could mechanically damage the electrical connection between the rod and the foil, and/or reduce the effectiveness of the seal by exposing the adjacent end of the foil to chemical attack.

On the other hand, it has been found that if the silica is pressed too tightly against a rod in manufacture, cracks tend to appear in the silica in the vicinity of the rod on cooling, due to the difference in coefficients of expansion between the metal and the silica, and these cracks can extend to weaken or destroy the lamp. Accordingly the conditions necessary for forming satisfactory ribbon seals by existing techniques tend to be somewhat critical, and an object of the present invention is to provide a form of seal which is less subject to this difficulty.

According to the invention, in a lamp of the kind referred to, at least one of the rods of a ribbon seal is surrounded, over at least a part of the region of the rod which is embedded in the envelope wall, by a closely wound coil of relatively thin refractory metal wire.

It has been found that, in such a lamp, the fused silica can be pressed tightly around the rod in the region surrounded by the coil, thereby preventing any significant movement of the rod, without giving rise to the same tendency to crack on cooling as the existing forms of lamp employing ribbon-seals as described above.

The term "closely wound" means that adjacent turns of the wire are in contact or are separated by a distance which is less than the wire diameter.

Preferably the wire, which is conveniently of tungsten or molybdenum, has a diameter not more than 0.3 mm, and is wound around the rod under tension.

The wire coil may be held in position on the rod by spot welding or merely by twisting the ends of the wire together, and may be applied as a single layer only, or in two or more layers. In some lamps the foil strip of a ribbon seal may be connected to a plurality of lead rods, and in such a case a said wire coil preferably surrounds at least a part of the embedded region of each of the lead rods. Preferably also both the electrode rod and the lead rod or rods of a ribbon seal are provided with a said wire coil.

An electrode rod and/or lead-rod over which the wire is wound may have any convenient cross-section as in known ribbon-seal lamps, and may have flattened ends where joined to the molybdenum foil to give a large area of contact.

In some cases the foil can extend along a region of a rod around which the wire is wound, the wire coil surrounding both the rod and the foil, and serving to hold the foil firmly against the surface of the rod, thereby improving the electrical contact between them. With such a construction the need for welding the foil to the rod may in some cases be avoided.

The wire coil around an electrode or lead rod need not necessarily be in the form of a simple single strand of wire, but could alternatively be in the form of a coiled coil similar to that used to form the filaments of some electric incandescent lamps, or to form the cathodes of some fluorescent electric discharge lamps. Such coiled coils are constructed by winding a filament wire around a wire mandrel, the mandrel being subsequently removed. When such a coiled coil is used to form the wire of the present invention the mandrel may similarly be removed, although, if desired, it may be left in place, the mandrel with the filament coil around it, then being wound around the electrode or lead rod as the case may be.

In another arrangement the wire may be in the form of a triple coil. Such a coil is formed by winding a filament wire around a first mandrel and then winding the wound mandrel around a further mandrel, one or both mandrels being either left in position or removed.

In other embodiments the wire employed may be in the form of a multi-stranded or braided wire. Various other modifications are clearly possible.

The invention is also applicable to lamps incorporating multifoil seals in which two or more molybdenum foil strips are connected to the electrode rod, with the other ends of the strips each connected to one or more lead rods.

Figure 2:
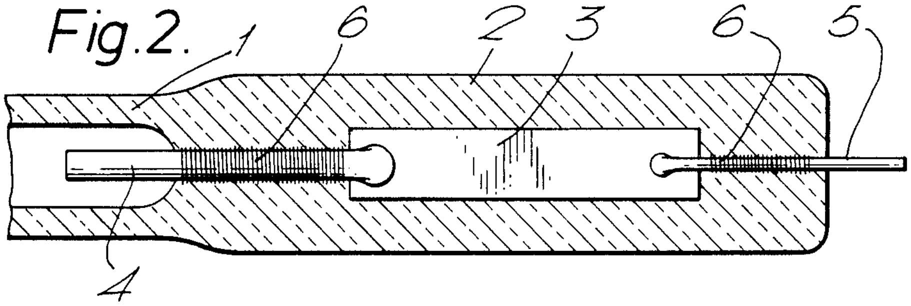
Figure 3:
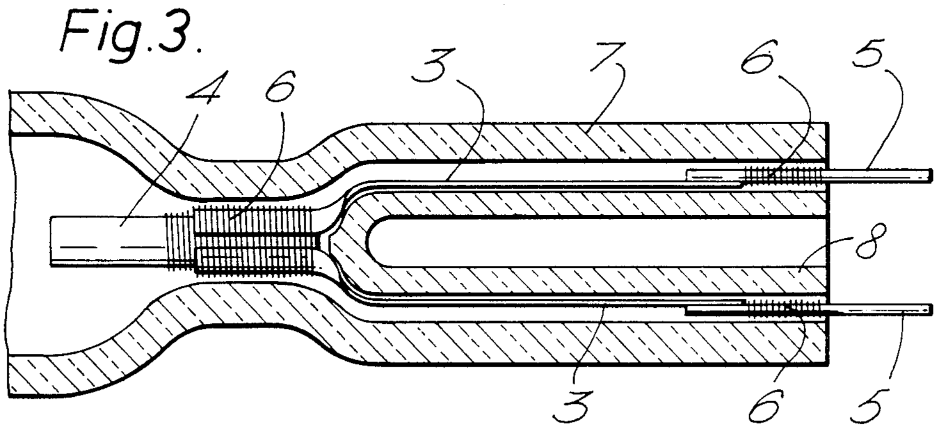
Figure 4:
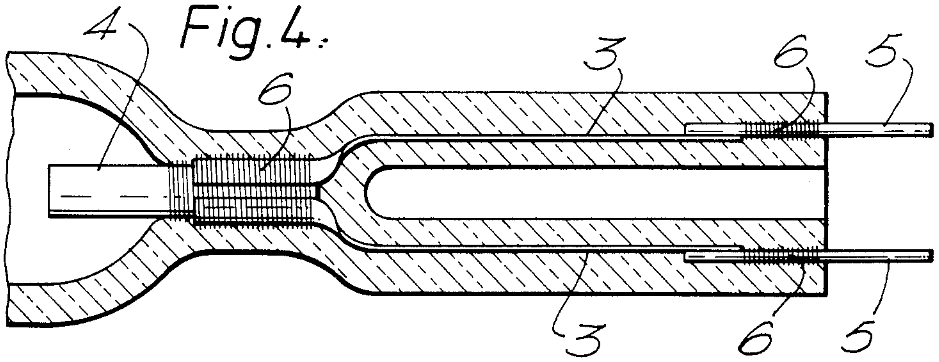
Figure 7:
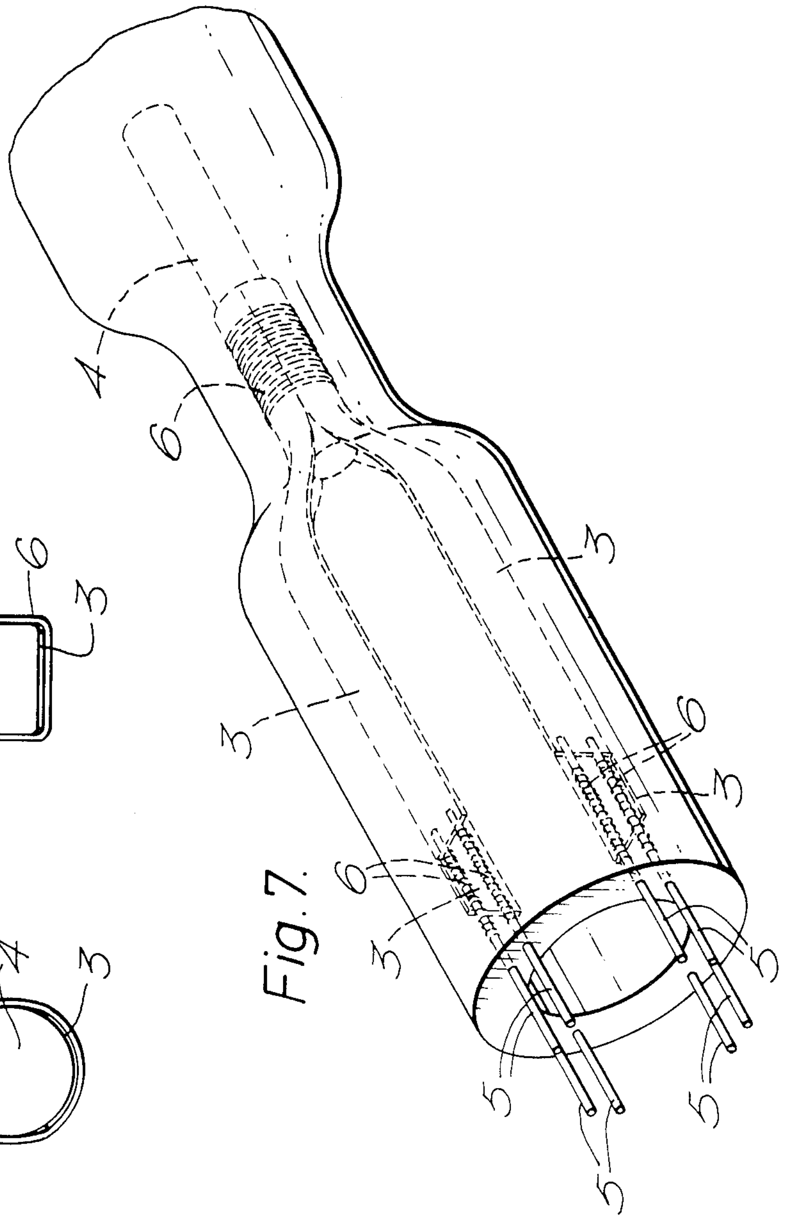
Figure 6:
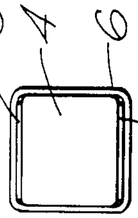
Figure 5:
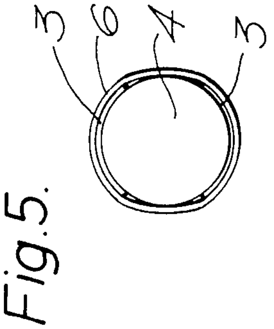

Three embodiments of the invention and modifications thereof will now be described by way of example with reference to FIGS. 1 to 11 of the accompanying schematic drawings, in which FIGS. 1 and 2 illustrate two longitudinal sectional views at right angles to each other of one end of one form of high pressure electric discharge lamp employing ribbon seals in accordance with the invention, FIGS. 3 and 4 illustrate a sectional view of one end of another lamp prior to and after the formation of a ribbon seal, FIGS. 5 and 6 illustrate alternative forms of electrode rods for use in the lamp of FIGS. 3 and 4, FIG. 7 shows part of another lamp, and FIGS. 8 to 11 illustrate on a greatly enlarged scale parts of four further lamps in accordance with the invention.

The lamp illustrated in part in FIGS. 1 and 2 comprises a tubular discharge envelope 1 of fused silica closed at each end by a pinch seal or a collapsed seal 2 through which is sealed an electrode lead assembly consisting of a strip 3 of molybdenum foil, a tungsten rod 4 which projects into the discharge envelope so as to constitute, or provide a support for, an electrode and which is welded to the inner end of the molybdenum foil strip 3, and a molybdenum lead rod 5 welded to the opposite end of the foil strip and projecting from the respective end of the envelope.

In accordance with the invention the ends of the rods 4, 5, which are embedded within the material of the seal are surrounded over at least part of their length by a closely wound coil 6 of tungsten or molybdenum wire having a diameter of approximately 0.1 mm. The wire is applied to each of the rods under tension so that it conforms closely to the surface thereof.

It has been found that in the manufacture of the lamp the fused silica can be pressed firmly into contact with each of the rod coil assemblies thereby ensuring that the assemblies are held firmly in position but without the risk of cracks being formed in the silica on subsequent cooling.

FIGS. 3 and 4 illustrate one end of a lamp having a multifoil seal, in a partly formed and completed state respectively.

The lamp comprises a fused silica envelope consisting of a tubular main part 7 which, in the completed lamp, encompassess the discharge space, and two smaller tubes 8, each of which fits into a respective end of the main part 7 and is closed at its inner end.

The lamp has a pair of tungsten rod electrodes 4, each connected to one end of a pair of molybdenum foil strips 3 which extend outwards between the inner tubes 8 and the main part 7 of the envelope and are connected at their outer ends to molybdenum lead rods 5 as shown. Both electrode rods 4 and the lead rods 5 are surrounded over part of their length by a closely wound coil 6 of tungsten or molybdenum wire, approximately 0.17 mm in diameter, and in order to form the seal the ends of the main part of the envelope are heated to the softening temperature of the silica and allowed to collapse on to the wire wound outer end of the electrode 4 and also on to the respective inner tube 5, so as to embed the foil strip 3 and the adjacent ends of the rods 4, 5 in the collapsed silica, as in FIG. 4.

As in the case of the lamp previously described, the silica can be pressed firmly into contact with the rod/-coil assemblies without the risk of cracks being formed in the silica on subsequent cooling.

In this lamp the inner ends of the foil strips 3 are wrapped partially around the outer end of the electrode rod 4 and both the rod and strips are surrounded by the respective wire coil 6, the latter then serving to hold the strips in firm electrical contact with the surface of the rod. The coil 6 around the rod 4 also reinforces the welds which secure the foil strips 3 to the rod, and thereby assists in supporting the rod during assembly of the seal.

The electrode rod 4 can have any convenient cross-section for example round or square as shown in FIGS. 5 and 6 respectively.

Multifoil seals are useful for high current devices, for example 30 amps or above, and the invention is not only applicable to seals incorporating two foil strips but may also be used to advantage in lamps having ribbon seals with a greater number of strips.

For example FIG. 7 illustrates one end of a high power lamp in which each electrode rod 4 is connected to four molybdenum foil strips 3, secured to the rod in a similar fashion to those of FIGS. 3 and 4, the overlapping ends of the rod and strips being similarly surrounded by a closely wound coil of tungsten or molybdenum wire 6. The outer ends of the strips 3 in this embodiment are each welded to a pair of lead rods 5 and each of these carries a closely wound wire coil 6 as in the previous embodiments.

In a modification a wire coil 6, instead of being wound directly on to an electrode or lead rod, as the case may be, can be preformed and then pushed over the respective rod.

Further modifications are illustrated in FIGS. 8 to 11.

Figure 8:
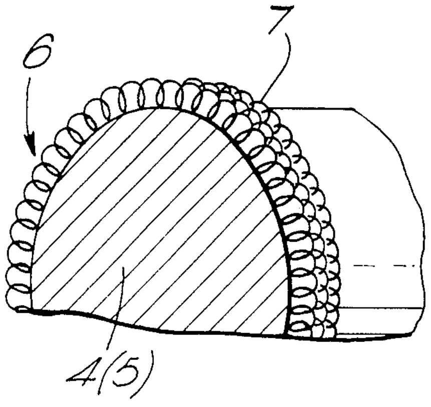

Thus, referring to FIG. 8, the wire 6, instead of being in the form of a simple strand, comprises a coiled coil 7 as employed to form the filaments of some forms of incandescent lamps or the cathodes of fluorescent lamps. The mandrel on which coil is wound can be removed, as would be the case when the coil is used to form the filament or cathode of such lamps, although in some cases it may be left in, the mandrel, with the coil around on it, then being wound around the electrode or lead rod 4, 5 as the case may be.

Figure 9:
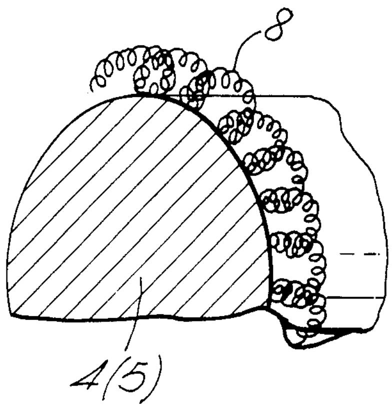

Instead of a coiled coil a triple coil may be used as illustrated at 8 in FIG. 9, the mandrels either being left in or one or more of them being removed.

Figure 10:
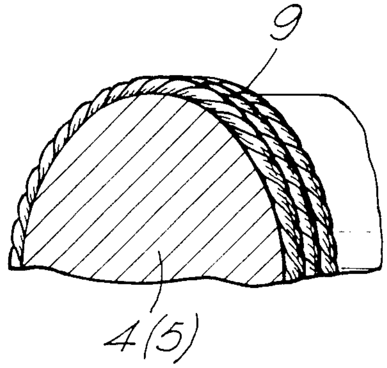
Figure 11:
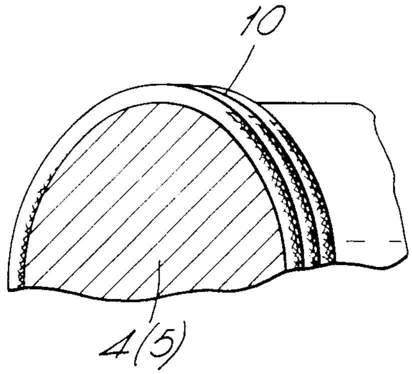

In further modifications multi-stranded wire 9 as illustrated in FIG. 10, or braided wire 10 as in FIG. 11 could alternatively be used.

The invention is applicable to lamps having envelopes of various dimensions and gas/vapour fillings, the precise dimensions and fillings in any particular case depending upon the use to which the lamp is to be put.

I claim:

1. A high pressure electric discharge lamp comprising a discharge envelope of fused silica containing a discharge supporting filling, a pair of electrodes between which an electric discharge passes in operation of the lamp, each said electrode comprising or being supported by a refractory metal rod and, at at least one end of the envelope, a further refractory metal rod projecting from said end of the envelope to provide an external lead and a strip of refractory metal foil extending between and connected electrically to the electrode rod and associated lead rod, wherein the improvement comprises:

at least one coil of relatively thin refractory metal wire wound tightly around a region of a respective electrode rod and/or associated lead rod, adjacent turns of the wire of the coil being in contact with one another or separated by a distance which is less than the diameter of the wire, the metal foil strip and at least a part of that region of a said rod which is surrounded by the wire coil being firmly embedded in a pinch seal at said end of the envelope, with the envelope material pressed tightly around said region of the rod.

2. A lamp according to claim 1 wherein the wire has a diameter of not more than 0.3 mm.

3. A lamp according to claim 2 wherein the wire has a diameter of approximately 0.1 mm.

4. A lamp according to claim 1 wherein the turns of the wire are under tension.

5. A lamp according to claim 1 wherein the wire is of tungsten or molybdenum.

6. A lamp according to claim 1 wherein the wire is applied as a single layer.

7. A lamp according to claim 1 wherein the wire is applied in two or more layers.

8. A lamp according to claim 1 wherein the electrode rod and the or each lead rod associated with a foil strip are each surrounded by a respective said wire coil.

9. A lamp according to claim 1 wherein the foil strip extends along a region of a rod around which the wire of a said coil is wound, the coil surrounding both the rod and the foil.

10. A lamp according to claim 1 in which the coil is in the form of a coiled coil.

11. A lamp according to claim 1 in which the wire coil is in the form of a coiled coil on a wire mandrel.

12. A lamp according to claim 1 in which the wire coil is in the form of a triple coil.

13. A lamp according to claim 1 in which the wire coil is in the form of a triple coil incorporating at least one mandrel.

14. A lamp according to claim 1 in which the wire coil is formed from a multi-stranded wire.

15. A lamp according to claim 1 in which the wire coil is formed from braided wire.

* * * * *